United States Patent
Morita et al.

(10) Patent No.: US 11,264,855 B2
(45) Date of Patent: Mar. 1, 2022

(54) COIL SUBSTRATE, LAMINATED COIL SUBSTRATE, MOTOR COIL SUBSTRATE, AND MOTOR

(71) Applicant: IBIDEN CO., LTD., Ogaki (JP)

(72) Inventors: Haruhiko Morita, Ogaki (JP); Hitoshi Miwa, Ogaki (JP); Shinobu Kato, Ogaki (JP); Toshihiko Yokomaku, Ibi-gun (JP); Hisashi Kato, Ogaki (JP); Takahisa Hirasawa, Ogaki (JP); Tetsuya Muraki, Ogaki (JP); Takayuki Furuno, Ogaki (JP)

(73) Assignee: IBIDEN CO., LTD., Ogaki (JP)

( * ) Notice: Subject to any disclaimer, the term of this patent is extended or adjusted under 35 U.S.C. 154(b) by 192 days.

(21) Appl. No.: 16/685,671

(22) Filed: Nov. 15, 2019

(65) Prior Publication Data
US 2020/0161919 A1 May 21, 2020

(30) Foreign Application Priority Data
Nov. 16, 2018 (JP) ................ JP2018-215119

(51) Int. Cl.
*H02K 3/26* (2006.01)
*H02K 3/28* (2006.01)

(52) U.S. Cl.
CPC ............... *H02K 3/26* (2013.01); *H02K 3/28* (2013.01); *H02K 2203/03* (2013.01)

(58) Field of Classification Search
CPC ......... H02K 3/26; H02K 3/28; H02K 2203/03
See application file for complete search history.

(56) References Cited

U.S. PATENT DOCUMENTS

| | | | | |
|---|---|---|---|---|
| 2008/0278857 | A1* | 11/2008 | Fujino | H05K 3/0061 360/245.9 |
| 2017/0048990 | A1* | 2/2017 | Sim | H04M 1/026 |
| 2020/0076263 | A1* | 3/2020 | Morita | H02K 3/28 |
| 2020/0161919 | A1* | 5/2020 | Morita | H02K 3/28 |
| 2021/0066982 | A1* | 3/2021 | Morita | H02K 3/47 |

FOREIGN PATENT DOCUMENTS

JP    2007-124892 A    5/2007

* cited by examiner

*Primary Examiner* — John K Kim
(74) *Attorney, Agent, or Firm* — Oblon, McClelland, Maier & Neustadt, L.L.P.

(57) ABSTRACT

A coil substrate includes a flexible substrate, and a coil including a wiring and formed on the flexible substrate. The flexible substrate has a cut penetrating through the flexible substrate such that the cut is formed to extend along a portion of the coil.

20 Claims, 3 Drawing Sheets

FIG. 1A
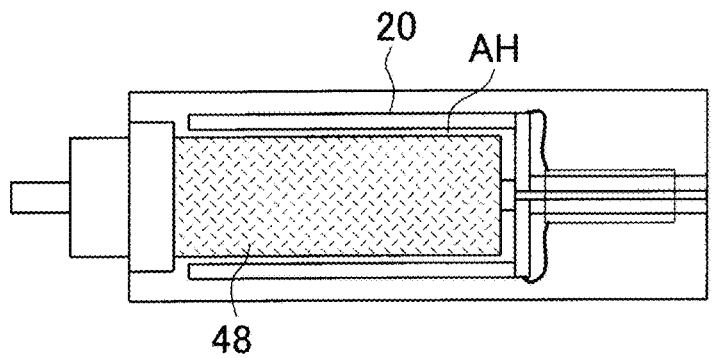
FIG. 1B
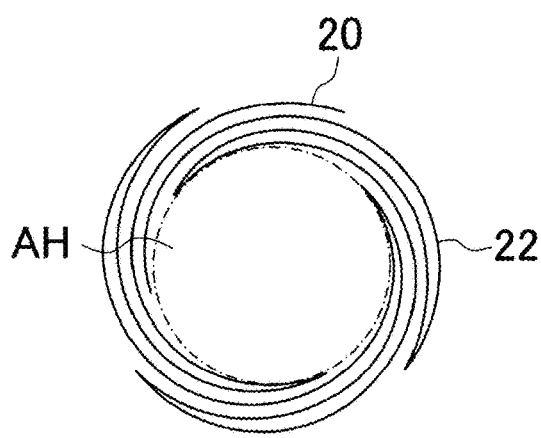
FIG. 1C
FIG. 1D
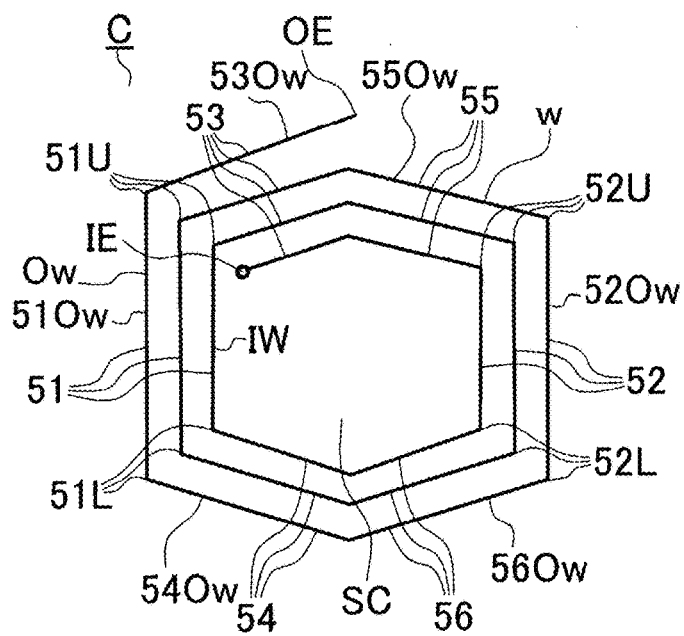
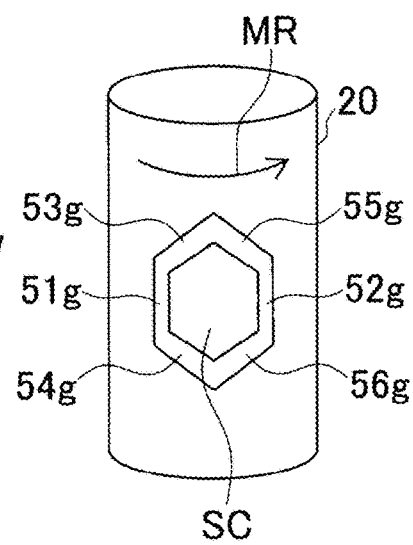

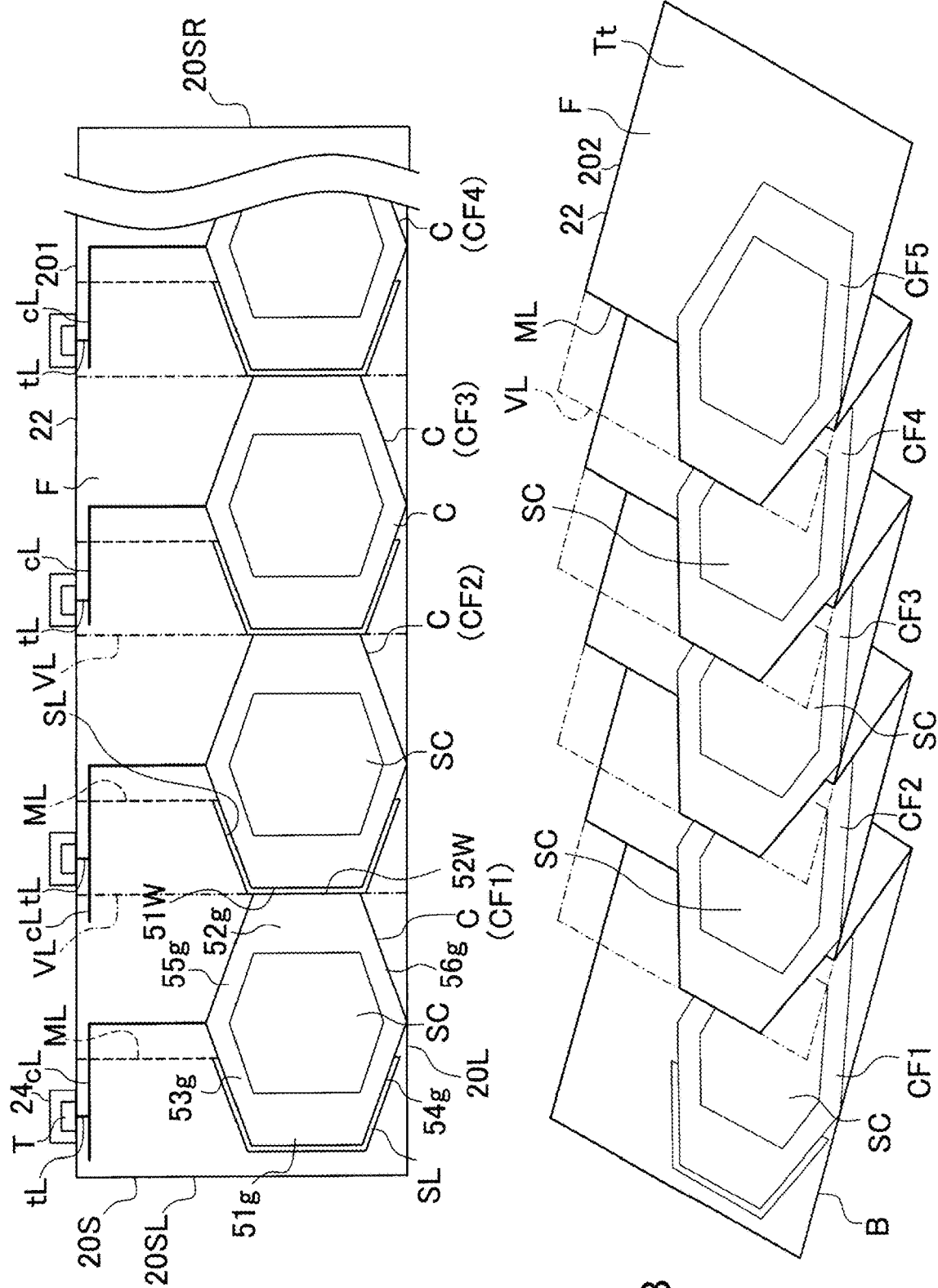

COIL SUBSTRATE, LAMINATED COIL SUBSTRATE, MOTOR COIL SUBSTRATE, AND MOTOR

CROSS-REFERENCE TO RELATED APPLICATIONS

The present application is based upon and claims the benefit of priority to Japanese Patent Application No. 2018-215119, filed Nov. 16, 2018, the entire contents of which are incorporated herein by reference.

BACKGROUND OF THE INVENTION

Field of the Invention

The present invention relates to a coil substrate that includes a flexible substrate and coils formed on the flexible substrate, and relates to a laminated coil substrate, a motor coil substrate, and a motor.

Description of Background Art

Japanese Patent Application Laid-Open Publication No. 2007-124892 relates to an electric motor, which includes multiple single coils formed of wires. The entire contents of this publication are incorporated herein by reference.

SUMMARY OF THE INVENTION

According to one aspect of the present invention, a coil substrate includes a flexible substrate, and a coil including a wiring and formed on the flexible substrate. The flexible substrate has a cut penetrating through the flexible substrate such that the cut is formed to extend along a portion of the coil.

According to another aspect of the present invention, a laminated coil substrate includes a flexible substrate, and a coil including a wiring and formed on the flexible substrate. The flexible substrate has folding lines formed parallel with respect to each other and a cut penetrating through the flexible substrate and formed to extend along a portion of the coil such that the flexible substrate is folded at the folding lines and that the cut of the flexible substrate is formed not to fold the coil

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1A is a schematic diagram of a motor;

FIG. 1B illustrates a cross section of a motor coil substrate;

FIG. 1C illustrates a coil;

FIG. 1D is a schematic diagram of the motor coil substrate;

FIG. 2A illustrates coils formed with wiring groups, cuts, and folding lines;

FIG. 2B illustrates an outline of a laminated coil substrate;

DETAILED DESCRIPTION OF THE EMBODIMENTS

Figure 3A:
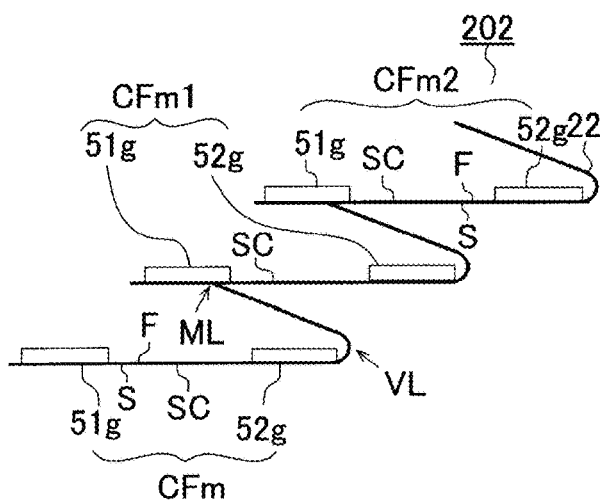
FIG. 3A illustrates a cross section of the laminated coil substrate.

Embodiments will now be described with reference to the accompanying drawings, wherein like reference numerals designate corresponding or identical elements throughout the various drawings.

FIG. 1A is a schematic diagram of a motor 10 that includes a magnet 48 and a motor coil substrate 20 of a first embodiment. The motor coil substrate 20 is positioned around the magnet 48 via a hollow space (AH). An example of the motor 10 is a DC motor. The motor 10 can further have a commutator, a brush and a housing (which are not illustrated in the drawings). In the first embodiment, the motor coil substrate 20 rotates. However, it is also possible that the magnet 48 rotates.

FIG. 1B illustrates a cross section of the motor coil substrate 20 illustrated in FIG. 1A. In FIG. 1B, the motor coil substrate 20 is schematically illustrated.

According to the embodiment, a coil substrate 201 for forming the motor coil substrate 20 is prepared. An outline of the coil substrate 201 is illustrated in FIG. 2A. By folding the coil substrate 201, a laminated coil 202 illustrated in FIG. 2B is formed. Then, by winding the laminated coil 202, the motor coil substrate 20 is manufactured. The number of windings is 1 or more and 5 or less. By positioning the magnet 48 inside the motor coil substrate 20, the motor 10 is manufactured.

As illustrated in FIG. 2A, the coil substrate 201 has a flexible substrate 22, multiple coils (C), and cuts (SL), the flexible substrate 22 having a first surface (F) and a second surface (S) on an opposite side with respect to the first surface (F), and the coils (C) being formed on the first surface (F) of the flexible substrate 22. The coils (C) formed on the first surface (F) are referred to as upper coils (CF). In FIG. 2A, the coils (C) are simplified.

As illustrated in FIG. 2A, the coil substrate 201 of the embodiment can have terminal substrates 24 and terminals (T) formed on the terminal substrates 24. The terminal substrates 24 and the flexible substrate 22 that supports the coils (C) are formed of one flexible substrate 22.

The terminals (T) and the coils (C) are simultaneously formed. The number of the terminal substrates 24 is preferably the same as the number of the upper coils (CF). The number of the terminals (T) is preferably the same as the number of the upper coils (CF).

As illustrated in FIG. 2A, the coil substrate 201 can include connection wirings (cL) and multiple terminal wirings (tL), the terminal wirings (tL) connecting the connection wirings (cL) to the terminals (T). The terminal wirings (tL) include a terminal wiring (tL) extending from a connection wiring (cL) connecting between the m-th upper coil (CFm) and the (m+1)-th upper coil (CFm1), and a terminal wiring (tL) extending from a connection wiring (cL) connecting between the N-th upper coil (CFn) and the 1st upper coil (CF1). In FIG. 2A, the connection wirings (cL) are partially illustrated.

As illustrated in FIG. 2A, the flexible substrate 22 preferably has short sides (20S) and long sides (20L). The upper coils (CF) are formed along the long sides (20L) of the flexible substrate 22. The upper coils (CF) are formed in one row from one end (20SL) to the other end (SR) of the flexible substrate 22. The number of the upper coils (CF) is N. N is a natural number. N is 3 or more and 11 or less.

The coils (C) are formed using a technology for a printed wiring board, and wirings (w) forming the coils (C) are formed by plating. Or, the wirings (w) forming the coils (C) are formed by etching a copper foil. The wirings (w) forming the coils (C) are formed using a semi-additive method, an M-Sap method, or a subtractive method.

The wirings (w) forming the coils (C) of the embodiment are formed using a technology for a printed wiring board. Therefore, a cross-sectional shape of each of the wirings (w) is substantially rectangular. Since a cross section of a wire is a circle, according to the embodiment, a space factor of the coils can be increased.

The multiple coils (C) formed on the flexible substrate 22 are simultaneously formed. For example, the multiple coils (C) are formed on the flexible substrate 22 using an alignment mark. Therefore, positions of the coils (C) are related to each other.

FIG. 1C illustrates an example of the m-th coil (C), where m is a natural number. As illustrated in FIG. 1C, the coils (C) are each formed to have a central space (SC) and a wiring (w) surrounding the central space (SC). The wiring (w) has an outer end (OE) and an inner end (IE). The wiring (w) is formed between the outer end (OE) and the inner end (IE). The wiring (w) forming a coil (C) is formed in a spiral shape. The central space (SC) is surrounded by an innermost wiring of the wiring (w) forming the coil (C). Among multiple wirings (w), an innermost wiring (w) is an inner side wiring (wI). An outermost wiring (w) is an outer side wiring (Ow).

As illustrated in FIG. 1C, the wiring (w) includes multiple first wirings 51 and multiple second wirings 52, the first wirings 51 facing the second wirings 52 across the central space. In one coil (C), the first wirings 51 are close the one end (20SL), and the second wirings 52 are close to the other end (SR). The first wirings 51 are formed substantially parallel to each other. The second wirings 52 are formed substantially parallel to each other. The first wirings 51 and the second wirings 52 are formed substantially parallel to each other. When the motor 10 of the embodiment is manufactured, the magnet 48 is positioned in the motor coil substrate 20 such that an angle between the first wirings 51 and a rotation direction of the motor is substantially 90 degrees.

The first wirings 51 each have an upper end (51U) and a lower end (51L) on an opposite side with respect to the upper end (51U). The second wirings 52 each have an upper end (52U) and a lower end (52L) on an opposite side with respect to the upper end (52U). The upper ends (51U, 52U) are close to the terminal (T), and the lower ends (51L, 52L) are far from the terminal (T).

The wiring (w) has third wirings 53 that respectively extend from the upper ends (51U) of the first wirings 51.

The wiring (w) has fourth wirings 54 that respectively extend from the lower ends (51L) of the first wirings 51.

The wiring (w) has fifth wirings 55 that respectively extend from the upper ends (52U) of the second wirings 52.

The wiring (w) has sixth wirings 56 that respectively extend from the lower ends (52L) of the second wirings 52.

The third wirings 53 are respectively connected to the fifth wirings 55.

The fourth wirings 54 are respectively connected to the sixth wirings 56.

Among the multiple first wirings 51, an outermost wiring is an outer side first wiring (51Ow).

Among the multiple second wirings 52, an outermost wiring is an outer side second wiring (52Ow).

Among the multiple third wirings 53, an outermost wiring is an outer side third wiring (53Ow).

Among the multiple fourth wirings 54, an outermost wiring is an outer side fourth wiring (54Ow).

Among the multiple fifth wirings 55, an outermost wiring is an outer side fifth wiring (55Ow).

Among the multiple sixth wirings 56, an outermost wiring is an outer side sixth wiring (56Ow).

Winding directions of the upper coils (CF) in the coil substrate are the same. Directions of currents flowing through the upper coils (CF) in the coil substrate are the same. The winding directions and the directions of the currents are observed from a position above the first surface (F).

By combining the wirings (w) illustrated in FIG. 1C, the simplified coils (C) in FIG. 2A are obtained. The multiple first wirings 51 form a first wiring group (51g). The multiple second wirings 52 form a second wiring group (52g). The multiple third wirings 53 form a third wiring group (53g). The multiple fourth wirings 54 form a fourth wiring group (54g). The multiple fifth wirings 55 form a fifth wiring group (55g). The multiple sixth wirings 56 form a sixth wiring group (56g).

As illustrated in FIG. 2A, the cuts (SL) are respectively formed along the coils (C). The cuts (SL) are respectively formed outside the coils (C). Each of the cuts (SL) is formed along a portion of a respective coil (C). The cuts do not respectively entirely surround the coils (C).

Figure 3B:
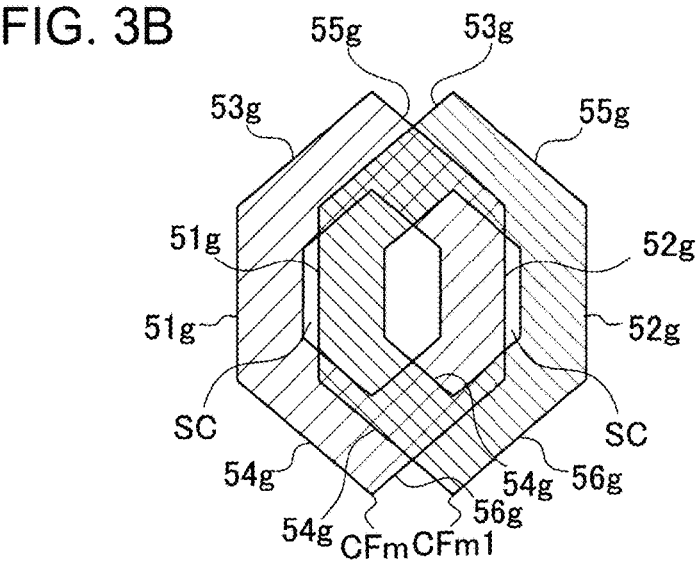
FIG. 3B illustrates overlapping of the coils.
Figure 3C:
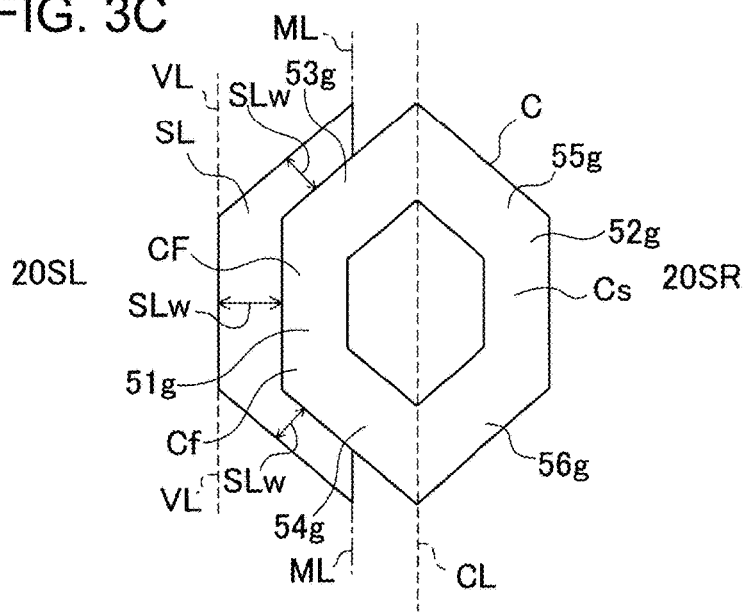
FIG. 3C illustrates a coil and a cut.

FIG. 3C illustrates a coil (C), a cut (SL), the one end (20SL) and the other end (SR). In FIG. 3C, similar to FIG. 2A, the coil is drawn using the wiring groups. As illustrated in FIG. 3C, the coil (C) is divided into two portions. The coil (C) is formed to include a portion (first portion) (CO near the one end (20SL) and a portion (second portion) (Cs) near the other end (SR). The cut (SL) is formed along the outer side wiring (Ow) of the first portion (Cf). The cut (SL) is not formed along the outer side wiring (Ow) of the second portion (Cs). A width (SLAV) of the cut (SL) is substantially uniform. A straight line (CL) dividing the coil (C) into the two portions is substantially parallel to the first wirings 51.

In the example of FIGS. 2A and 3C, the cut (SL) is formed along the outer side first wiring (51Ow), the outer side third wiring (53Ow) and the outer side fourth wiring (54Ow). The cut (SL) along the outer side first wiring (51Ow) is connected to the cut (SL) along the outer side third wiring (53Ow). The cut (SL) along the outer side first wiring (51Ow) is connected to the cut (SL) along the outer side fourth wiring (54Ow). The cut (SL) along the outer side third wiring (53Ow) is along a portion of the outer side third wiring (53Ow). The cut (SL) along the outer side fourth wiring (54Ow) is along a portion of the outer side fourth wiring (54Ow).

In the example of FIG. 2A, the cuts (SL) are respectively formed along the coils (C). The cut (SL) along the 1st coil can be eliminated. Among the coils, the 1st coil (CF1) is closest to the one end (20SL).

As illustrated in FIG. 2B, the coil substrate 201 is folded using the cuts (SL). The coil substrate 201 is folded along folding lines (VL, ML). The folding lines (VL, ML) are illustrated in FIGS. 2A, 2B, 3A and 3C. The coil substrate 201 is folded such that the first surface (F) and the first surface (F) face each other. The laminated coil substrate 202 illustrated in FIG. 2B is obtained. The laminated coil substrate 202 is formed to include the folded flexible substrate 22 and the coils (C) formed on the flexible substrate 22. The folding lines (VL, ML) are substantially parallel to the first wirings 51. The folding lines (ML) each extend from an end of a respective cut (SL). The folding lines (VL) each extend from one side of a respective cut (SL) along the outer side first wiring (51Ow). The folding lines (VL) are each connected to one side of a respective cut (SL) close to the one end (20SL).

As illustrated in FIG. 2B, the laminated coil substrate 202 has a bottom surface (B) and a top surface (Tt) on an opposite side with respect to the bottom surface (B). The bottom surface (B) is a lowermost surface of the laminated coil substrate 202, and the top surface (Tt) is an uppermost surface of the laminated coil substrate 202. As illustrated in FIG. 2B, the flexible substrate 22 is folded such that a stairway is formed in one direction from the bottom surface (B) to the top surface (Tt).

As illustrated in FIGS. 3A and 3B, when the coil substrate 201 is folded, the first wiring group (51g) of the (m+1)-th upper coil (CFm1) is positioned on the central space (SC) of the m-th upper coil (CFm). Further, the central space (SC) of the (m+1)-th upper coil (CFm1) is positioned on the second wiring group (52g) of the m-th upper coil (CFm).

In the embodiment, by folding the flexible substrate 22, the coils (C) formed on the flexible substrate 22 can be stacked on each other. Therefore, the coils (C) can be stacked on each other with high accuracy. A space factor of the coils can be efficiently increased. Conductor resistance of the coils is lowered. A motor having high efficiency can be provided.

The coil substrate 201 has the cuts (SL). Then, by folding the coil substrate 201 using the cuts (SL), the laminated coil substrate 202 of the embodiment is formed. Therefore, a distance between adjacent coils (C) can be shortened. For example, there is almost only a cut (SL) between adjacent coils (C). There is almost only a cut (SL) between the second wiring group (52g) forming the m-th coil (C) and the first wiring group (51g) forming the (m+1)-th coil (C). The coil substrate can be shortened. Cost of the coil substrate can be reduced. Since distances between the coils are short, the coils can be stacked on each other with high positional accuracy.

The winding directions of the coils (C) in the coil substrate 201 are the same. The winding directions of the coils (C) in the laminated coil substrate 202 are the same.

The directions of the currents flowing through the coils (C) in the coil substrate 201 are the same. The directions of the currents flowing through the coils (C) in the laminated coil substrate 202 are the same.

As illustrated in FIG. 1B, by winding the laminated coil substrate 202, the motor coil substrate 20 is obtained. The laminated coil substrate 202 is wound around the hollow space (AH). An example of a shape of the motor coil substrate 20 is a cylindrical shape.

The motor coil substrate 20 is positioned around the magnet 48 such that the top surface (Tt) and the magnet 48 oppose each other. Or, the motor coil substrate 20 is positioned around the magnet 48 such that the bottom surface (B) and the magnet 48 oppose each other. The magnet 48 is positioned in the motor coil substrate 20 such that the angle between the first wirings 51 and the rotation direction of the motor is substantially 90 degrees. The motor 10 including the magnet 48 and the motor coil substrate 20 is completed. Since the laminated coil substrate 202 is positioned around the magnet 48, a positional relationship between the m-th upper coil (CFm) and the (in ±1)-th upper coil (CFm1) can be maintained. A motor having high efficiency can be provided.

FIG. 1D is a schematic diagram of the motor coil substrate 20. FIG. 1D illustrates the rotation direction (MR) of the motor 10 and a coil (C). In FIG. 1D, the coil (C) is drawn using wiring groups. The angle between the first wirings 51 and the rotation direction (MR) of the motor 10 is substantially 90 degrees.

Multiple coils can be added on the second surface (S) of the flexible substrate 22 of the embodiment. Coils (C) on the second surface (5) are referred to as lower coils (CS). The upper coils (CF) respectively oppose the lower coils (CS) via the flexible substrate 22. When the lower coils (CS) are projected on the first surface (F) with light perpendicular to the first surface (F), the upper coils (CF) respectively substantially overlap with the lower coils (CS). Winding directions of an upper coil (CF) and a lower coil (CS) that oppose each other are the same. Directions of currents flowing through an upper coil (CF) and a lower coil (CS) that oppose each other are the same. The upper coils (CF) are connected to the lower coils (CS) by through-hole conductors penetrating the flexible substrate 22. The winding directions of the coils (C) and the directions of the currents flowing through the coils (C) are observed from a position above the first surface (F).

The electric motor of Japanese Patent Application Laid-Open Publication No. 2007-124892 includes multiple single coils formed of wires. The coils are formed of wires. When the wires are thin, it is thought to be difficult to wind the wires. It is thought that the wires may break. Since the coils are formed of wires, it is thought to be difficult to increase a space factor. According to FIG. 6 of Japanese Patent Application Laid-Open Publication No. 2007-124892, the single coils are stacked on each other. It is thought to be difficult to stack the single coils formed of wires with high positional accuracy.

A coil substrate according to an embodiment of the present invention includes: a flexible substrate; at least one coil formed on the flexible substrate; and at least one cut that penetrates the flexible substrate and is formed along the at least one coil.

A laminated coil substrate according to an embodiment of the present invention is formed by folding a coil substrate that includes: a flexible substrate; at least one coil formed on the flexible substrate; and at least one cut that penetrates the flexible substrate and is formed along the at least one coil, using the at least one cut.

A motor coil substrate according to an embodiment of the present invention is formed by winding a laminated coil substrate. The laminated coil substrate is formed by folding a coil substrate that includes: a flexible substrate; at least one coil formed on the flexible substrate; and at least one cut that penetrates the flexible substrate and is formed along the at least one coil, using the at least one cut.

A motor according to an embodiment of the present invention is formed to include: a motor coil substrate formed by winding a laminated coil substrate; and a magnet positioned inside the motor coil substrate. The laminated coil substrate is formed by folding a coil substrate that includes: a flexible substrate; at least one coil formed on the flexible substrate; and at least one cut that penetrates the flexible substrate and is formed along the at least one coil, using the at least one cut.

According to an embodiment of the present invention, coils are formed of wirings. For example, the coils can be formed using a technology for a printed wiring board. Therefore, the wirings forming the coils can be formed to each have a substantially rectangular shape. A space factor of the coils can be increased. The coil substrate has cuts. Then, by folding the coil substrate using the cuts, a laminated coil substrate of an embodiment is formed. Therefore, a distance between adjacent coils can be shortened. The coil substrate can be shortened. Cost of the coil substrate can be reduced. By folding, adjacent coils partially overlap each other. Since distances between the coils are short, the coils can be stacked on each other with high positional accuracy. A motor coil substrate is formed by winding a folded flexible substrate. Therefore, a space factor of the coils can be increased. A motor coil substrate having high efficiency can be provided.

Obviously, numerous modifications and variations of the present invention are possible in light of the above teachings. It is therefore to be understood that within the scope of the appended claims, the invention may be practiced otherwise than as specifically described herein.

The invention claimed is:

1. A laminated coil substrate, comprising:
 a flexible substrate; and
 a coil comprising a wiring and formed on the flexible substrate,
 wherein the flexible substrate has a plurality of folding lines formed parallel with respect to each other and a cut penetrating through the flexible substrate and formed to extend along a portion of the coil such that the flexible substrate is folded at the folding lines and that the cut of the flexible substrate is formed not to fold the coil.

2. The laminated coil substrate according to claim 1, wherein the coil is formed in a plurality such that the plurality of coils is arrayed on the flexible substrate in a row.

3. The laminated coil substrate according to claim 2, wherein each of the coils is formed to have a central space such that the wiring surrounds the central space, and the flexible substrate is folded such that a portion of the wiring of the (m+1)-th coil is positioned on the central space of the m-th coil where the m being a natural number.

4. The laminated coil substrate according to claim 2, wherein the plurality of coils is configured to flow current through the plurality of coils in a same direction.

5. The laminated coil substrate according to claim 2, wherein each of the coils is formed to have a central space such that the wiring surrounds the central space, and the wiring of each of the coils has a first wiring and a second wiring facing each other across the central space such that the first wiring and the second wiring are formed to extend substantially parallel with respect to each other.

6. The laminated coil substrate according to claim 1, wherein the coil has a first portion on a first end of the coil and a second portion on a second end of the coil on an opposite side with respect to the first end such that the cut is formed to extend along the first portion of the coil.

7. The laminated coil substrate according to claim 1, wherein the flexible substrate is formed such that the cut is formed to surround the coil without entirely surrounding the coil.

8. The laminated coil substrate according to claim 3, wherein the plurality of coils is configured to flow current through the plurality of coils in a same direction.

9. The laminated coil substrate according to claim 3, wherein the wiring of each of the coils has a first wiring and a second wiring facing each other across the central space such that the first wiring and the second wiring are formed to extend substantially parallel with respect to each other.

10. The laminated coil substrate according to claim 2, wherein the coil has a first portion on a first end of the coil and a second portion on a second end of the coil on an opposite side with respect to the first end such that the cut is formed to extend along the first portion of the coil.

11. The laminated coil substrate according to claim 2, wherein the flexible substrate is formed such that the cut is formed to surround the coil without entirely surrounding the coil.

12. A motor coil substrate, comprising:
 the laminated coil substrate of claim 1 formed such that the laminated coil substrate is wound in a cylindrical shape.

13. A motor, comprising:
 a magnet; and
 the motor coil substrate of claim 12 positioned such that the magnet is accommodated inside the laminated coil substrate of the motor coil substrate via a hollow space between the laminated coil substrate and the magnet.

14. The motor according to claim 13, wherein the coil is formed in a plurality such that the plurality of coils is arrayed on the flexible substrate in a row, and the plurality of coils is configured to flow current through the plurality of coils in a same direction.

15. A motor, comprising:
 a magnet; and
 the motor coil substrate of claim 12 positioned such that the magnet is accommodated inside the laminated coil substrate of the motor coil substrate via a hollow space between the laminated coil substrate and the magnet,
 wherein the coil is formed in a plurality such that the plurality of coils is arrayed on the flexible substrate in a row, each of the coils is formed to have a central space such that the wiring surrounds the central space, and the wiring of each of the coils has a first wiring and a second wiring facing each other across the central space such that the first wiring and the second wiring are formed to extend substantially parallel with respect to each other and that an angle between a rotation direction of the motor and the first wiring is substantially 90 degrees.

16. A motor coil substrate, comprising:
 the laminated coil substrate of claim 2 formed such that the laminated coil substrate is wound in a cylindrical shape.

17. A motor, comprising:
 a magnet; and
 the motor coil substrate of claim 16 positioned such that the magnet is accommodated inside the laminated coil substrate of the motor coil substrate via a hollow space between the laminated coil substrate and the magnet.

18. A motor coil substrate, comprising:
 the laminated coil substrate of claim 3 formed such that the laminated coil substrate is wound in a cylindrical shape.

19. A motor, comprising:
 a magnet; and
 the motor coil substrate of claim 18 positioned such that the magnet is accommodated inside the laminated coil substrate of the motor coil substrate via a hollow space between the laminated coil substrate and the magnet.

20. A motor coil substrate, comprising:
 the laminated coil substrate of claim 4 formed such that the laminated coil substrate is wound in a cylindrical shape.

* * * * *